United States Patent [19]
Mankovitz

[11] Patent Number: 5,552,837
[45] Date of Patent: Sep. 3, 1996

[54] REMOTE CONTROLLER FOR SCANNING DATA AND CONTROLLING A VIDEO SYSTEM

[75] Inventor: Roy J. Mankovitz, Encino, Calif.

[73] Assignee: Gemstar Development Corporation, Pasadena, Calif.

[21] Appl. No.: 396,559

[22] Filed: Mar. 1, 1995

[51] Int. Cl.$^6$ ..................................................... H04N 5/00
[52] U.S. Cl. ........................... 348/734; 348/906; 358/335; 360/33.1; 235/472
[58] Field of Search ..................................... 348/906, 734, 348/731, 5.5; 358/335; 360/33.1; 235/454, 472; 455/155.1, 26.1, 179.1, 185.1, 186.2; H04N 5/44, 5/00

[56] References Cited

U.S. PATENT DOCUMENTS

| | | | |
|---|---|---|---|
| 2,700,065 | 1/1955 | Evans | 178/5.8 |
| 2,851,550 | 9/1958 | Searcy | 200/51.02 |
| 2,856,474 | 10/1958 | Norris | 200/44 |
| 4,012,583 | 3/1977 | Kramer | 358/84 |
| 4,247,743 | 1/1981 | Hinton, et al. | 200/44 |
| 4,321,593 | 3/1982 | Ho et al. | 340/541 |
| 4,348,696 | 9/1982 | Beier | 358/188 |
| 4,390,901 | 6/1983 | Keiser | 358/147 |

(List continued on next page.)

FOREIGN PATENT DOCUMENTS

| | | | |
|---|---|---|---|
| 4129571 | 3/1993 | Germany | H04N 5/44 |
| 139532 | 8/1983 | Japan | H04N 5/44 |
| 83243 | 4/1991 | Japan | G11B 15/02 |

OTHER PUBLICATIONS

Lamar West, Himanshu Parikh, Neil Robertson, Allen Childers, Mark Doremus, Off Premises Technology Comparisons, *Scientific-Atlanta* 1989 NCTA Technical Papers, pp. 39–56.

James A. Chiddix, David M. Pangrac, Off–Premises Broadband Addressability: A CATV Industry Challenge, *American Television and Communications Corporation*, Stamford Connecticut, 1989 NCTA Technical Papers, pp. 57–64.

Gary Libman, Times Staff Writer Chaining the Channels, A New Generation of Television Blocking Systems Allows More Options for Parents Seeking to Control Kids' Viewing, *Los Angeles Times* Aug. 9, 1993.

Daniel H. Smart, Innovative Aspects of a Switched Star Cabled Television Distribution System, *British Cable Sevices Limited*, 1987 NCTA Technical Papers, pp. 26–35.

Richard G. Merrell, Mack S. Daily, An Auto–Dialer Approach to Pay–Per–View Purchasing, *Zenith Electronics Corporation*, Glenview, Illinois, 1989 NCTA Technical Papers, pp. 34–38.

Daniel F. Walsh Jr., Timing Considerations in RF Two Way Data Collection and Polling, *Jerrold–Applied Media Lab*, 1989 NCTA Technical Papers, pp. 47–56.

Gregory F. Vaeth, John Feras, Enertec, Inc., The Addressable Controller of the Future, *General Instrument/Jerrold Communication*, 1990 NCTA Technical Papers, pp. 274–279.

*Primary Examiner*—Safet Metjahic
*Assistant Examiner*—Glenton B. Burgess
*Attorney, Agent, or Firm*—Christie, Parker & Hale, LLP

[57] ABSTRACT

Apparatus and methods are provided for controlling a video system. In one embodiment the apparatus includes a remote controller including a device for scanning a printed input data card including a type code printed on the input data card, the type code for representing a category of input data printed on the card, and the type code printed as a line of patterns, each pattern being relatively dark or light to represent a binary one or binary zero, and the input data card including a plurality of printed input data, each input data printed as a line of patterns, each pattern being relatively dark or light to represent a binary one or binary zero. The apparatus further includes a television for storing the received input data and the type code and for enabling viewing of only programs in the stored input data, each program having a channel, a date, a time-of-day, and a length of time.

29 Claims, 18 Drawing Sheets

| TYPE CODES (1030) | CATEGORY OF INPUT DATA (1032) |
|---|---|
| 05 | CHANNEL MAPPING |
| 10 | PARENTAL GUIDANCE–G |
| 11 | PARENTAL GUIDANCE–PG |
| 12 | PARENTAL GUIDANCE–PG–13 |
| 13 | PARENTAL GUIDANCE–R |
| 14 | PARENTAL GUIDANCE–SELECTED PROGRAMS |
| 15 | PARENTAL GUIDANCE–SELECTED CHANNELS |
| 20 | THEME SELECTION–NEWS |
| 21 | THEME SELECTION–SPORTS |
| 22 | THEME SELECTION–MOVIES–G |
| 23 | THEME SELECTION–MOVIES–PG |
| 24 | THEME SELECTION–MOVIES–R |
| 25 | THEME SELECTION–MOVIES |
| 26 | THEME SELECTION–EDUCATIONAL |
| 27 | THEME SELECTION–HISTORY |

1034, 1036

U.S. PATENT DOCUMENTS

| | | | |
|---|---|---|---|
| 4,475,153 | 10/1984 | Kihara et al. | 235/454 |
| 4,510,623 | 4/1985 | Bonneau et al. | 455/181 |
| 4,566,033 | 1/1986 | Reidenouer | 358/115 |
| 4,604,708 | 8/1986 | Lewis | 364/900 |
| 4,605,964 | 8/1986 | Chard | 358/147 |
| 4,647,735 | 3/1987 | Sicher | 200/43.08 |
| 4,648,667 | 3/1987 | Baumgart | 339/37 |
| 4,718,107 | 1/1988 | Hayes | 455/4 |
| 4,768,229 | 8/1988 | Benjamin et al. | 380/20 |
| 4,823,385 | 4/1989 | Hegendorfer | 380/10 |
| 4,841,132 | 6/1989 | Kajitani et al. | 235/472 |
| 4,888,796 | 12/1989 | Olivo, Jr. | 379/101 |
| 4,903,031 | 2/1990 | Yamada | 342/359 |
| 4,930,158 | 5/1990 | Vogel | 380/5 |
| 5,001,554 | 3/1991 | Johnson et al. | 358/86 |
| 5,021,916 | 6/1991 | Hubbard | 361/171 |
| 5,033,085 | 7/1991 | Rew | 380/20 |
| 5,046,125 | 9/1991 | Takizawa | 455/26.1 |
| 5,051,837 | 9/1991 | McJunkin | 358/349 |
| 5,053,797 | 10/1991 | Samuels et al. | 354/322 |
| 5,056,139 | 10/1991 | Littlefield | 380/20 |
| 5,307,173 | 4/1994 | Yuen et al. | 358/335 |
| 5,335,079 | 8/1994 | Yuen et al. | 358/335 |

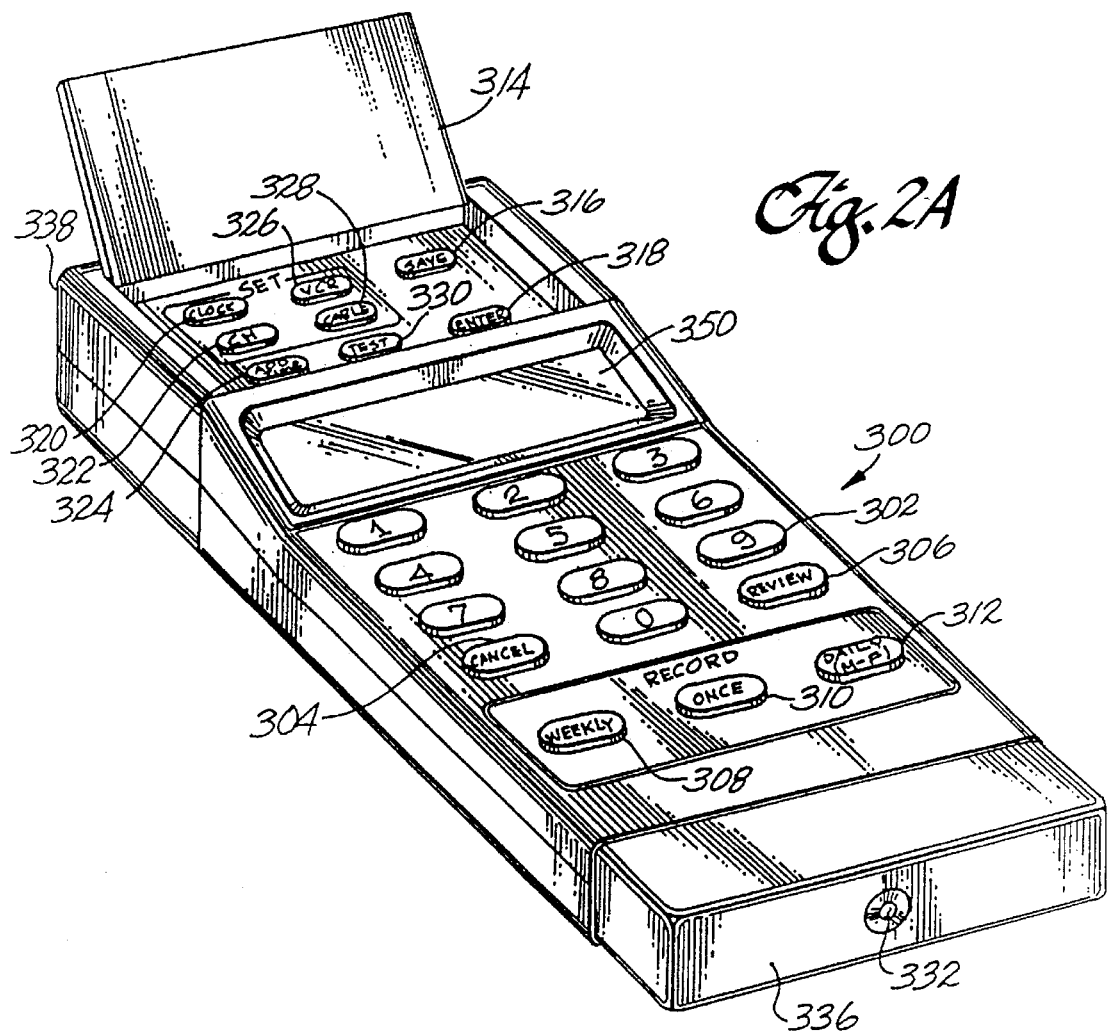

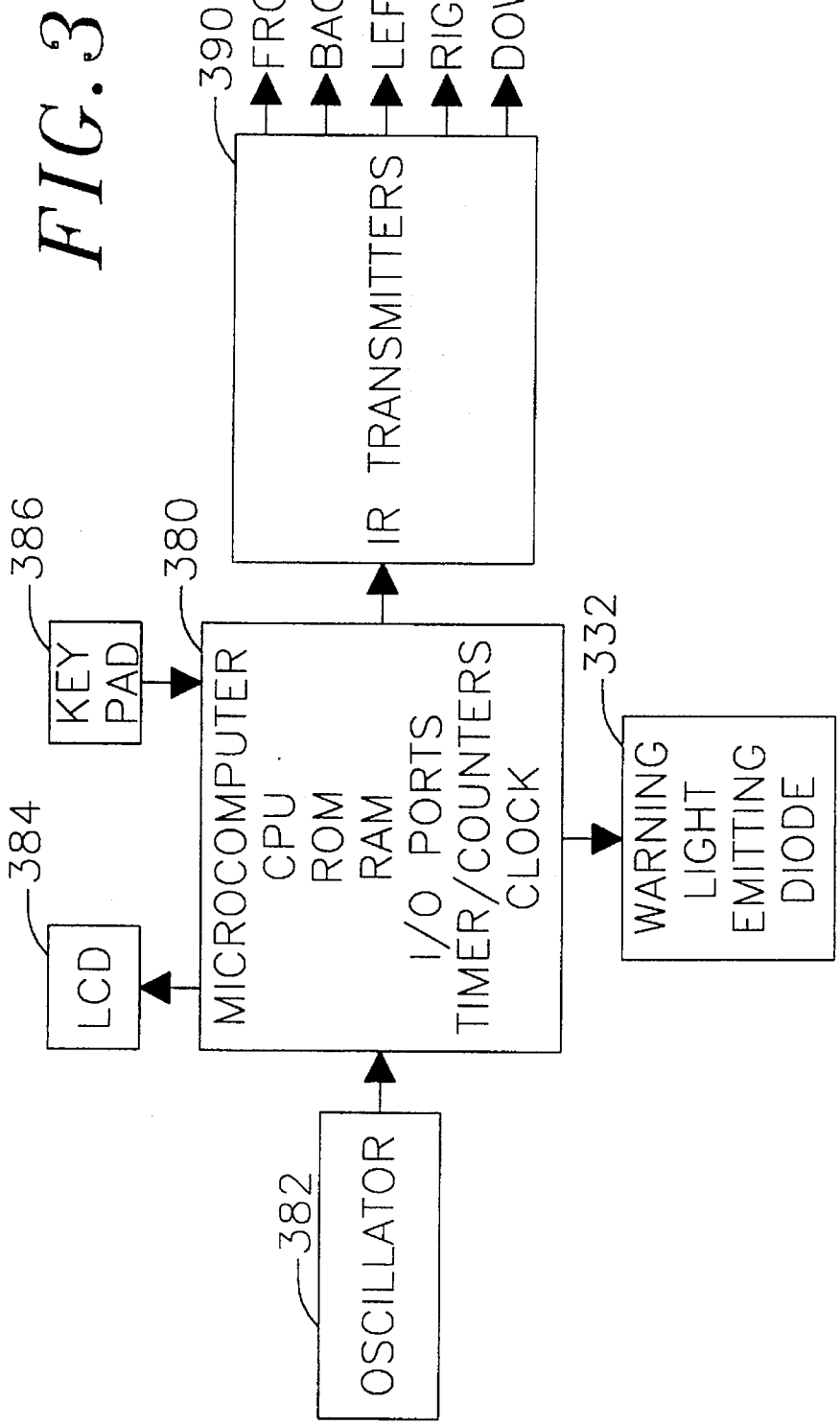

THURSDAY ~204

208~ 18 24 SPORTS RETROSPECTIVE; 60 MIN.[68713]
206~6PM 24 NATURESCENE[5321]
A VISIT TO THE COLORADO NATIONAL MONUMENT
NEAR GRAND JUNCTION, WHERE WILDFLOWERS,
INSECTS AND BIRDS ARE OBSERVED.
34 52 NOTICIAS[62921][496649] ~212
40 DWIGHT THOMPSON--RELIGION;[68553]
50 HUMANITIES THROUGH THE ARTS[493065]
56 BEVERLY HILLBILLIES--COMEDY[496777]

FEBRUARY 10, 1989 ~202

FRIDAY ~204

CB DIS MOVIE--DRAMA; 70 MIN.(23627113) ~200
206~6:30 11 FAMILY TIES(CC)--COMEDY[15657]
MALLORY'S REUNION WITH HER COLLEGE BOY FRIEND
(JOHN DUKAKIS) HAS HER WORRIED THAT SHE MAY
NOT BE AS INTERESTING TO HIM AS SHE ONCE WAS.
208~ 56 HOGAN'S HEROES–COMEDY[510857]
CARTERS MASQUERADE AS A TRAITOR MAY BE
KAPUT: A LOVELY FRAULEIN IS TRYING TO POISON HIM.
C4 NIK DOUBLE DARE--GAME(29225) ~212
C11 TNN VIDEO COUNTRY(29129)
C7 USA CARTOON EXPRESS(23561)
206~7PM 5 CHARLES IN CHARGE(CC)--COMEDY[1065]
WHILE PLANNING A PIZZA-PARLOR PARTY, CHARLES
ALIENATES THE POWELL CHILDREN BY DISMISSING
THEIR SUGGESTIONS ABOUT ORGANIZING THE EVENT.

FIG. 5

| CABLE | | BROADCAST | VCR+™ |
|---|---|---|---|
| 2 | KCBS | 2 | 02 |
| 3 | ESPN | | 34 |
| 4 | KNBC | 4 | 04 |
| 5 | KTLA | 5 | 05 |
| 7 | KABC | 7 | 07 |
| 8 | USA | | 44 |
| 9 | KCAL | 9 | 09 |
| 10 | MTV | | 48 |
| 11 | KTTV | 11 | 11 |
| 12 | CNN | | 42 |
| 13 | KCOP | 13 | 13 |
| 15 | PRTK | | 27 |
| 17 | TBS | | 43 |
| 18 | KSCI | 18 | 18 |
| 19 | KWHY | 22 | 22 |
| 20 | VHL20 | | 70 |
| 21 | VHL21 | | 93 |
| 22 | VHL22 | | 65 |
| 24 | KTBN | 40 | 40 |
| 26 | KDOC | 56 | 56 |
| 28 | KCET | 28 | 28 |
| 30 | KLCS | 58 | 17 |
| 31 | TLC/INTL | | 72 |
| 32 | WOR | | 60 |
| 33 | KVEA | 52 | 23 |
| 34 | KMEX | 34 | 14 |
| 35 | CITY | | 12 |
| 37 | CSPN | | 29 |
| 38 | VHL44 | | 69 |
| 40 | HBO | | 33 |

CHANNEL ASSIGNMENTS

USE X FOR A CABLE BOX
USE C FOR CABLE AND NO CABLE BOX
USE N FOR NON-CABLE USER

712 → (X column)    714 → (N column)
710 → (+ column)    716 → (table)

| + | X | C | N |
|---|---|---|---|
| 12 | 35 | 35 |    |
| 14 | 34 | 34 | 34 |
| 17 | 30 | 30 | 58 |
| 22 | 19 | 19 |    |
| 23 | 33 | 33 | 52 |
| 27 | 15 | 15 |    |
| 31 | 66 | 58 |    |
| 33 | 40 | 40 |    |
| 34 | 3  | 3  |    |
| 35 | 46 | 46 |    |
| 37 | 50 | 50 |    |
| 38 | 61 | 99 |    |
| 39 | 62 | 54 |    |
| 40 | 24 | 24 | 40 |
| 42 | 12 | 12 |    |
| 43 | 17 | 17 |    |
| 44 | 8  | 8  |    |
| 45 | 42 | 42 |    |
| 46 | 63 | 55 |    |

| TYPE CODES | CATEGORY OF INPUT DATA |
|---|---|
| 05 | CHANNEL MAPPING |
| 10 | PARENTAL GUIDANCE–G |
| 11 | PARENTAL GUIDANCE–PG |
| 12 | PARENTAL GUIDANCE–PG-13 |
| 13 | PARENTAL GUIDANCE–R |
| 14 | PARENTAL GUIDANCE–SELECTED PROGRAMS |
| 15 | PARENTAL GUIDANCE–SELECTED CHANNELS |
| 20 | THEME SELECTION–NEWS |
| 21 | THEME SELECTION–SPORTS |
| 22 | THEME SELECTION–MOVIES–G |
| 23 | THEME SELECTION–MOVIES–PG |
| 24 | THEME SELECTION–MOVIES–R |
| 25 | THEME SELECTION–MOVIES |
| 26 | THEME SELECTION–EDUCATIONAL |
| 27 | THEME SELECTION–HISTORY |

REMOTE CONTROLLER FOR SCANNING DATA AND CONTROLLING A VIDEO SYSTEM

BACKGROUND OF THE INVENTION

1. Field of the Invention

This invention relates to televisions, video cassette recorders and remote controllers for controlling televisions and video cassette recorders and the timer preprogramming feature of video cassette recorders (VCRs) for recording programs.

2. Description of the Related Art

Cable channel systems and satellite television channel transmission systems are providing an increasing number of channels for television viewing. As the number of channels available to a viewer increases, the burden on the television user increases. For example, in the past a user could switch between less than 10 channels to determine the programs that are playing and to select a channel for viewing. In today's systems, the hundred and fifty to two hundred channels available make this a virtually impossible task. Many of today's users aimlessly switch channels via a remote controller, which is a process sometimes referred to as channel surfing, to find a channel with programming of interest. Sometimes the user merely wishes to watch news or sports but must switch through all of the channels before a channel with news is found. It would be more convenient if the user could surf through channels having only news. For example, if the user could surf through channels such as CNN, HEADLINE NEWS, and KABC, then the user's chances of finding a news program of interest would be increased. The user may also be interested in seeing only channels with certain types of movies.

Another desire of many parents is to control their children's viewing of television. On cable and satellite television many programs are available which may be objectionable to a parent. The parent may prefer to restrict viewing on the television to only programs with a G rating.

Many modern TVs and VCRs have a setup procedure, generally called "channel skipping," in which a user can request a tuner to tune through all channels, but skip those which do not have a signal. Some TVs also allow a user to setup the TV to tune to only favorite channels.

Since so many channels are available, manually setting up a television or remote controller to only scan through certain channels may be a prohibitive task. For example, if there are fifty favorite channels then the user would have to manually enter fifty channels. This could be quite time consuming. The setup is further complicated by the fact that programming on stations changes from day to day or week to week. Each time the programming changed, the user may have to re-enter the "favorite" channels.

U.S. Pat. No. 5,335,079 issued Aug. 2, 1994, which is incorporated herein by this reference as though set forth in full, describes apparatus and methods for using compressed codes for recorder preprogramming. As described in the patent, one of the steps is to map an assigned channel to a local channel number. In order to set up the apparatus for using compressed codes for recorded preprogramming, the user must enter data into a table that is used for mapping assigned channel numbers to local channel numbers. For systems with up to two hundred channels, entering the data for the channel mapping table can be a tedious task.

SUMMARY OF THE INVENTION

An object of the present invention is to provide a user with a more convenient method of inputting data for controlling a video system. Another object of the invention is to provide a method for user to input a channel map for mapping assigned channels to local channel numbers. Yet another object of the present invention is to provide an apparatus and method for a user to input a set of channels corresponding to a selected theme, such as news, sports, or G rated movies. Another object of the present invention is to allow a user to enter selected programs or selected channels to be enabled for viewing.

According to the invention, methods and apparatus are provided for controlling a video system. In one embodiment the apparatus includes a remote controller including a device for scanning a printed input data card including a type code printed on the input data card, the type code for representing a category of input data printed on the card, and the type code printed as a line of patterns, each pattern being relatively dark or light to represent a binary one or binary zero, and the input data card including a plurality of printed input data, each input data printed as a line of patterns, each pattern being relatively dark or light to represent a binary one or binary zero. The apparatus further includes a television for storing the received input data and the type code and for enabling viewing of only programs in the stored input data, each program having a channel, a date, a time-of-day, and a length of time.

In a specific embodiment the type code is for a program category and the input data is arranged in a plurality of groups of lines of patterns of input data, each group of input data being a compressed code representative of, and compressed in length from, the combination of a channel, a date, a time-of-day, and a length of time for a program. The television includes a decoder for decoding and expanding each compressed code into a channel, a date, a time-of-day, and a length of time for a program.

In another embodiment the television includes a device for enabling a recorder to record only programs in the stored input data.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 2A is a perspective view of an apparatus for using compressed codes for recorder preprogramming.

FIG. 3 is a schematic of the circuitry for implementing the apparatus of FIGS. 2A or 2B.

FIG. 4 is an illustration of part of a television calendar showing compressed codes for preprogramming a recorder for recording programs.

FIG. 5 is a table relating assigned channel numbers to local channel numbers.

FIG. 6 is a channel assignment table arranged according to the present invention.

FIGS. 10 through 13 are data input cards containing type codes and input data that can be scanned by the remote controller of FIG. 7 according to the present invention.

FIG. 14 is a table relating the type codes for categories of input data according to the present invention.

DETAILED DESCRIPTION

Figure 1:
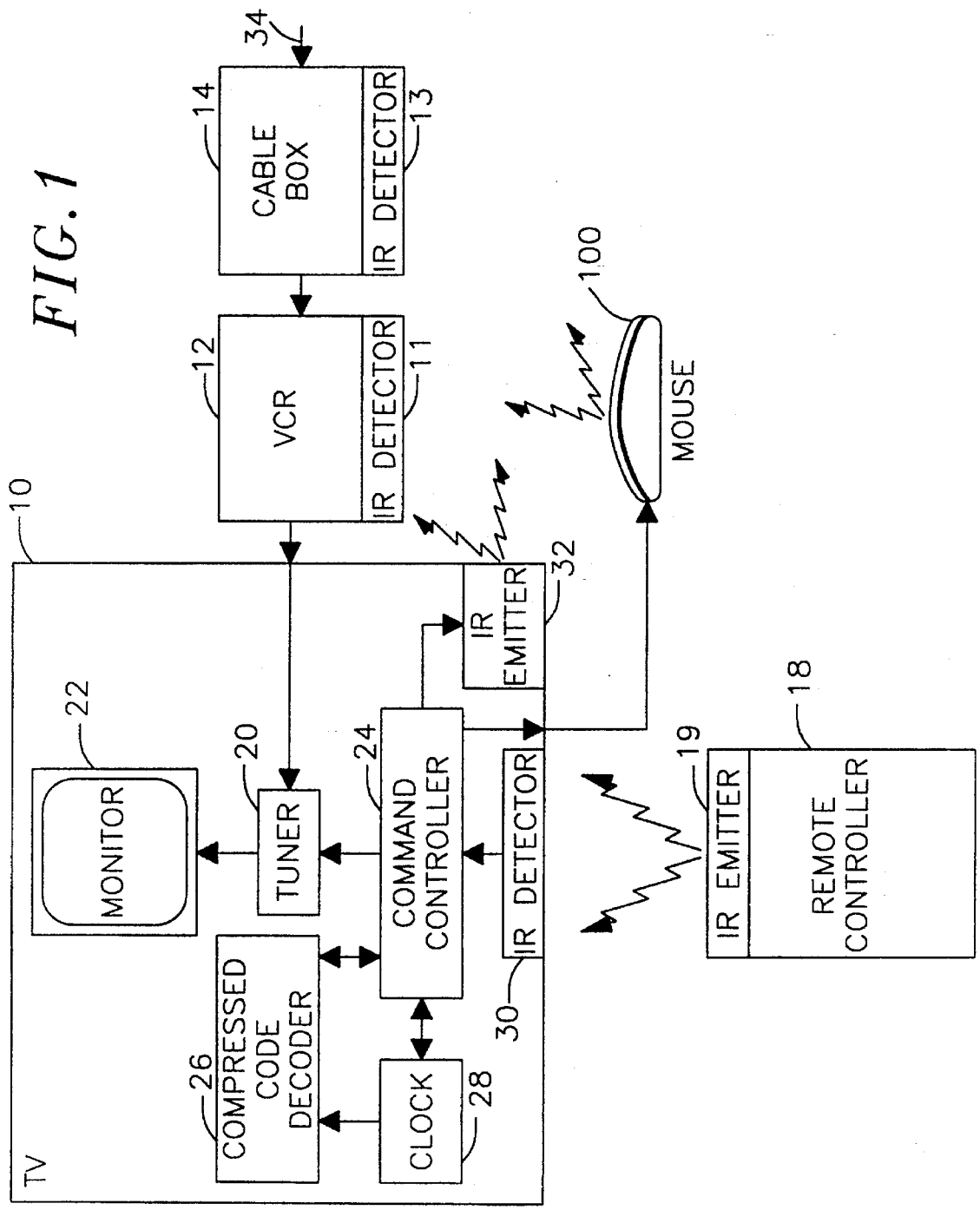
FIG. 1 is a diagram of a system for controlling a video system according to the present invention.

Referring now to the drawings, and more particularly, to FIG. 1, a video system is shown which includes a cable box 14, a VCR 12, and a television 10. The television 10 includes a tuner 20 and monitor 22 and in addition includes a command controller 24, compressed code decoder 26, clock 28, IR detector 30, and IR emitter 32. A remote controller 18 with an IR emitter 19 can be used to send commands to TV 10 via IR detector 30. The TV 10 can then control the VCR 12 and the cable box 14 via command controller 24 and IR emitter 32 or an infrared transmitter on mouse 100. The mouse emits infrared signals and can be placed adjacent to the VCR 12 and/or the cable box 14. Both the cable box and the VCR have IR detectors 13 and 11, respectively. The input to the cable box is a television signal source 34 which can be, for example, a cable input. The command controller 24 can consist of a microcomputer including a CPU, a ROM, a RAM, I/O ports, timers, and counters. The command controller 24 and the compressed decoder 26 can be used to decode compressed codes, as described in U.S. Pat. No. 5,335,079. The compressed codes can be input from remote controller 18 to the television 10, and used to control recording of programs by VCR 12, or used by television 10 to control tuner 20. For example, the tuner 20 can be controlled to enable only certain programs or certain channels for viewing on monitor 22. Other channels not enabled are blocked from monitor 22.

Figure 2B:
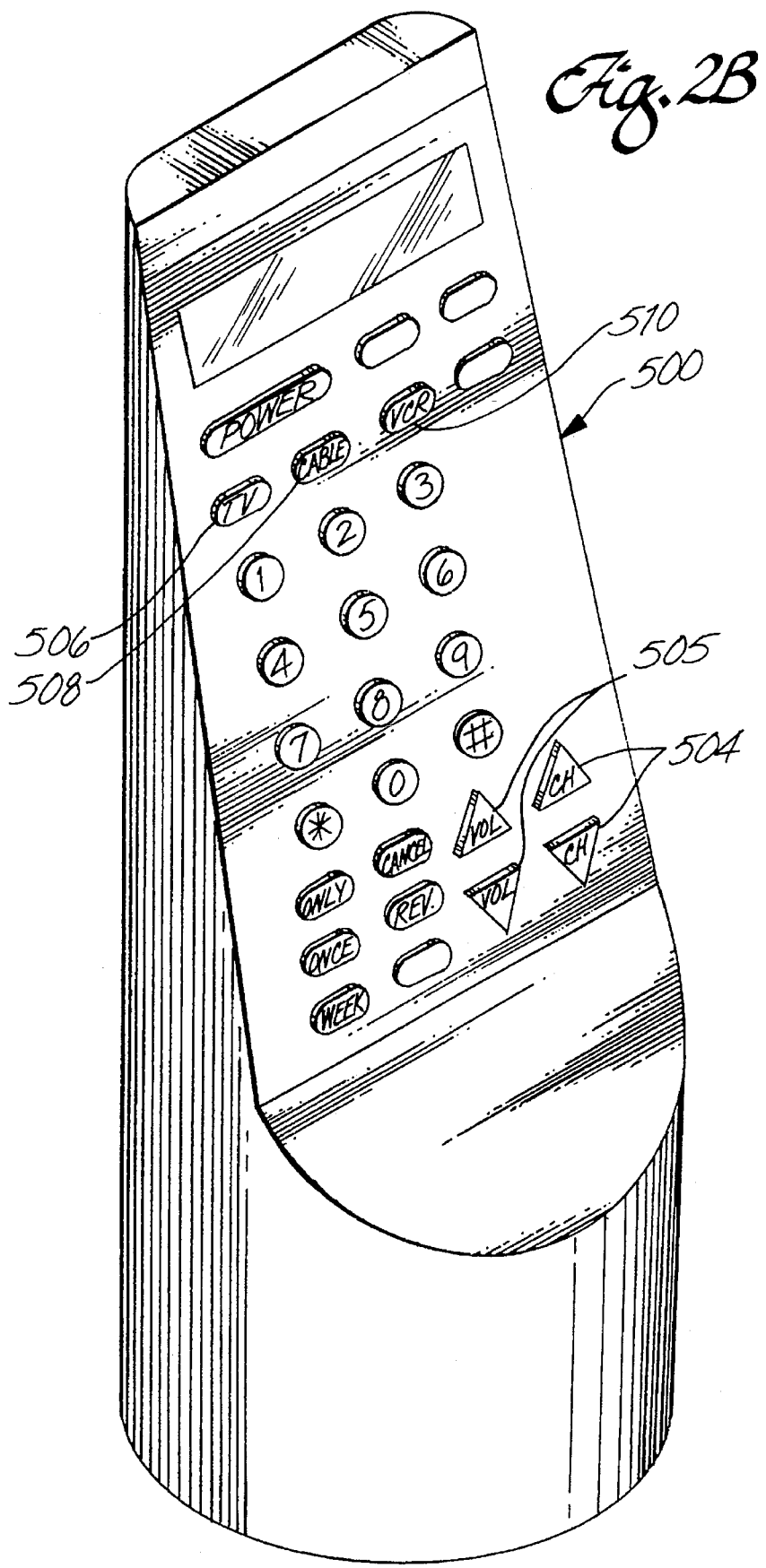
FIG. 2B is a perspective view of a universal remote controller for using compressed codes for recorder preprogramming.

The remote controller 18 can also be used to directly control VCR 12. In a preferred embodiment the remote controller 18 can be an instant programmer for using compressed codes for recorder programming, as shown in FIG. 2A, or a custom programmer 500 as shown in FIG. 2B that performs all of the functions of the instant programmer while also performing the functions of a universal remote controller.

The operation of the instant programmer 300 is described in U.S. Pat. No. 5,335,079. The instant programmer 300 has number keys 302, which are numbered 0 through 9, a CANCEL key 304, a REVIEW key 306, a WEEKLY key 308, a ONCE key 310 and a DAILY (M-F) key 312. A lid normally covers other keys, which are used to setup the instant programmer 300. When lid 314 is lifted, the following keys are revealed: SAVE key 316, ENTER key 318, CLOCK key 320, CH key 322, ADD TIME key 324, VCR key 326, CABLE key 328, and TEST key 330. The instant programmer has a display 350. The custom programmer 500 has additional keys for performing the universal remote controller function, including TV key 506, cable key 508, VCR key 510, channel up/down keys 504 and volume up/down keys 505. By placing instant programmer 300 or the custom programmer 500 in front of the equipment to be programmed such as video cassette recorder 12, cable box 14, and television 10, as shown in FIG. 1, the instant programmer 300 or custom programmer 500 can transmit signals to control the television and to control program recording by VCR 12.

FIG. 3 is a schematic of the circuitry needed to implement the instant programmer 300 or the custom programmer 500. The circuitry consists of microcomputer 380, oscillator 382, liquid crystal display 384, key pad 386, IR transmitters 390 and red warning light emitting diode 332. The microcomputer 380 consists of a CPU, ROM, RAM, I/O ports, timers, counters and clock. The ROM is used for program storage and the RAM is used among other purposes for stack storage of the programs to be recorded. The liquid crystal display 384 is display 350 of FIG. 2A. The key pad 386 implements all the previously discussed keys. The IR transmitters 390 consists of front infrared (IR) diode 340, left IR diode 342, down IR diode 344, two back IR diodes 346 and right IR diode 348, or another arrangement of IR diodes, which can communicate to the television, VCR, and cable box.

Initially, the user performs a setup sequence for the instant programmer 300 or the custom programmer 500. Since different VCRs and cable boxes have different infrared codes, the remote controller must be set up to work with the user's equipment. First, the user looks up the number corresponding to the model/brand of VCR to be programmed in a table, which lists the VCR brand name and a two digit code. Then with the VCR tuned to Channel 3 or Channel 4, whichever is normally used, the user turns the VCR "OFF". Then the user presses the VCR key 326. When the display shows VCR, the user presses the two-digit code looked up in the VCR model/brand table (for example 01 for RCA). The user points the instant programmer 300 at the VCR and then presses ENTER key 318. The red warning light emitting diode 332 will flash while it is sending a test signal to the VCR. If the VCR turned "ON" and changed to Channel 09, the user presses the SAVE key 316 and proceeds to the set clock step. If the VCR did not turn "ON" or turned "ON" but did not change to Channel 09 the user presses ENTER key 318 again and waits until red warning light emitting diode 332 stops flashing. The instant programmer 300 sends the next possible VCR code, while the red warning light emitting diode 332 is flashing. If the VCR turns "ON" and changed to Channel 09 the user presses SAVE key 316, otherwise the user presses ENTER key 318 again until the VCR code is found that works for the VCR. The display shows "END" if all possible VCR codes for that brand are tried. If so, the user presses VCR key 326 code 00 and then ENTER key 318 to try all possible codes, for all brands, one at a time.

Once the proper VCR code has been found and saved, the next setup step is to set the clock on instant programmer 300. First, the user presses the CLOCK key 320. When the display shows: "YR:", the user presses the year (for example 90), then presses ENTER key 318. Then the display shows "MO:", and the user presses the month (for example 07 is July), and then presses ENTER key 318. This is repeated for "DA:" date (for example 01 for the 1st), "Hr:" hour (for example 02 for 2 o'clock), "Mn:" minute (for example 05 for 5 minutes), and "AM/PM:" 1 for AM or 2 for PM. After this sequence, the display will show "SAVE" for a few seconds and then the display will show the current time and date that have been entered.

Next, if the instant programmer 300 is also to be used as a cable box controller, then the setup steps are as follows. First, the number corresponding to the model/brand of cable box (converter) to be controlled is looked up in a cable box model brand table, that lists cable box brands and corresponding two digit codes. The VCR is tuned to Channel 03 or 04 and turned "OFF". Then the cable box is tuned to Channel 02 or 03, whichever is normal, and left "ON". Then the CABLE key 328 is pressed. When the display shows: "CA B-:" the user enters the two digit code looked up in cable box model brand table, points the instant programmer 300 at the cable box (converter) and presses ENTER key 318. The red warning light emitting diode 332 will flash while it is sending a test signal to the cable box. If the cable box changed to Channel 09: then the user presses SAVE key 316; however, if the cable box did not change to Channel 09 the user presses ENTER key 318 again and waits until red warning light emitting diode 332 stops flashing, while the next possible code is sent. This is repeated until the cable box changes to Channel 09 and when it does the user presses SAVE key 316. If the display shows "END" then the user has tried all possible cable box codes for that brand. If so, the user presses cable code 00 and then ENTER key 318 to try all possible brand's codes, one at a time.

To operate the instant programmer 300 or the custom programmer 500 for recording programs on the VCR, the VCR should be left OFF and the cable box ON. The user looks up in the television guide the compressed code for the program, which he/she wishes to record. The compressed code 212 is listed in the television guide, as shown in FIG. 4. The compressed code 212 for the program selected by the user is entered into the instant programmer 300 or the custom programmer 500 by using the number keys 302 and then the user selects how often to record the program. The user presses the ONCE key 310 to record the program once at the scheduled time, or the user presses the WEEKLY key 308 to record the program every week at the same scheduled time until cancelled or the user presses the DAILY (M-F) key 312 to record the program each day Monday through Friday at the same scheduled time until cancelled. This is most useful for programs such as soapbox operas that air daily, but not on the weekend. To confirm the entry, the instant programmer 300 will immediately decode the compressed code and display the date, channel and start time of the program entered by the user. The length of the entered program is also displayed by time bars that run across the bottom of the display. Each bar represents one hour (or less) of program.

Then the user just needs to leave the instant programmer 300 near the VCR and cable box so that commands can be transmitted, and at the right time, the instant programmer 300 will turn "ON" the VCR, change to the correct channel and record the program and then turn the VCR "OFF". The user must just make sure to insert a blank tape.

Before using the instant programmer, users with cable or satellite must go through an additional setup procedure, because the cable or satellite channels are typically different for each cable and satellite carrier.

To address this problem, all the cable channels are permanently assigned a unique assigned channel number, which is valid across the nation. For example, ESPN is assigned to channel 1, HBO to channel 2, SHO to channel 3, etc. These assigned channels are published by the television guide publications.

To set up the instant programmer for channel assignments, first, the user presses the CH key 322. The display will look like this: "Guide CH TV CH". Then the user enters the assigned channel number printed in the television guide or calendar and then the user enters the local channel number that the assigned channel is received on through his/her broadcast, satellite, or local cable company. Then the user presses ENTER key 318. For example, HBO may have assigned channel 33. The local channel for HBO may be 40. In this case the user presses the CH key and then enters 33 and 40 and then presses the ENTER key. This is repeated for each assigned channel number. When this procedure is finished the user presses SAVE key 316.

After the channel settings have been saved, the user may review the settings by pressing CH key 322 and then REVIEW key 306. By repeated pressing of the REVIEW key 306 each of the set channels will scroll onto the display, one at a time.

Typically the television guide or calendar in the area will have a chart indicating the channel number that has been assigned to each Cable and broadcast channel, for example: HBO, CNN, ABC, CBS, NBC, etc. The published chart could correspond, for example, to the chart of FIG. 5.

A major problem is the arrangement and labeling of data in published charts. As shown in FIG. 5, the stations are arranged in a four column chart in numerical order by cable channel number in the left column. In this case, the cable channel number is the same as the local channel number or TV which is used during set up of the instant programmer. The stations in the left hand column are followed by an abbreviated name, such as HBO. In the middle column is a set of numbers labeled broadcast. The broadcast number is the same as a broadcast channel for a channel that is not received via cable. In the far right column is a set of numbers labeled VCR+™. The VCR+™ numbers correspond to the assigned channel numbers, which as indicated above in the set up discussion are also called the guide channel numbers. The labeling of these numbers as the VCR+™ numbers may be confusing to a consumer. In addition, the instructions which are packaged together with an instant programmer 300, list the stations arranged alphabetically by name with the result that the instructions are arranged differently than the published charts.

In summary there are differences between the arrangement and labeling of the instructions to the instant programmer and many of the published tables in newspaper television guides. This results in much confusion among purchasers as to which numbers to use to set up the instant programmer.

FIG. 6 shows a chart that reduces the confusion and lists the assigned or guide channel numbers that need to be mapped for a particular cable company. The mapping between assigned channel numbers and local channel numbers is a function of whether the consumer has cable, does not have cable, or uses or does not use a cable box. The table of FIG. 6 consists of four columns. The first column 710 lists the assigned channel numbers in numeric order. The next column 712 lists the corresponding local channels which the user should use if the user has a cable box. The next column 714 lists the local channels that the user should use if the user has cable but no cable box. The last column 716 lists the local channels for use by a user without cable.

Figure 7:
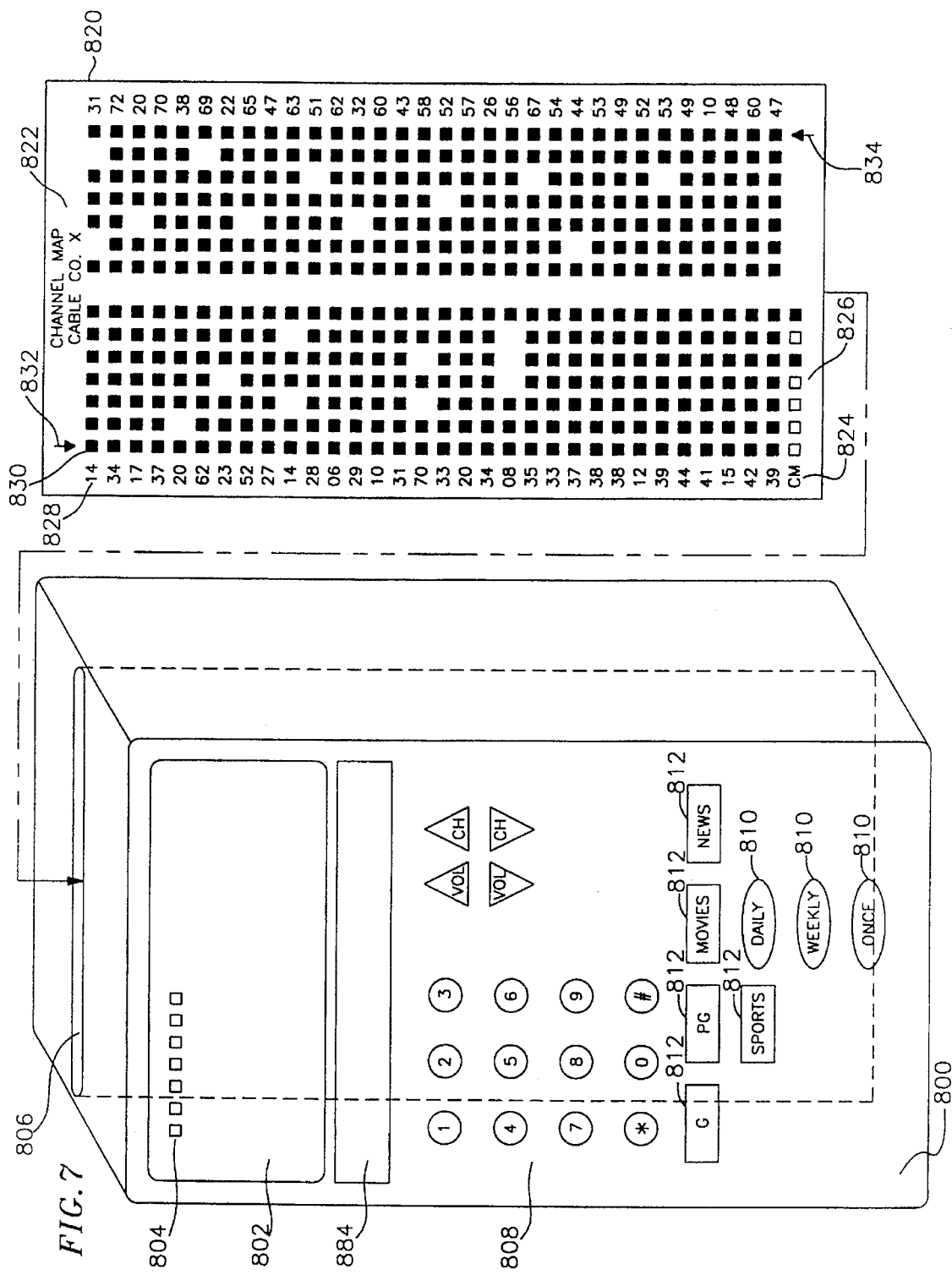
FIG. 7 is a drawing illustrating a remote controller having a scanner for reading codes according to the present invention.

Although using the table shown in FIG. 6 to set up the instant programmer 300 reduces confusion, the manual set up process for channel assignments is still a tedious process. This is especially true for systems with up to 200 channels. FIG. 7 is a diagram of a remote controller that incorporates the features of instant programmer 300 and custom programmer 500 and also provides a user with a convenient method for entering data for controlling a video system. The remote controller 800 has a display 884, a key pad 808, once, weekly, and daily keys 810, and theme keys 812. The remote controller also has a clear window 802 which covers a scanner array 804. The scanner array can scan patterns on data input card 820.

The data input card 820 has two columns of lines each of which have seven dots representing a seven bit binary word. The dots are black to represent a binary one or white to represent a binary zero. The seven dots can represent any number from 0–127. It is also possible to use more dots, such as 8, to represent numbers from 0–255. In the card illustrated in FIG. 7, the data card is for setting up the remote controller 800 and accomplishing the channel mapping function described above. The first line in the left hand column is a guide channel number (14) which is also known as an assigned channel number. The second line in the left hand column is the corresponding local channel number (34). The pairs of assigned channel numbers followed by local channel number proceed down the left column and then up the right column. If needed, two additional columns can be provided on the back side of the card. A total of 64 channel map pairs can be accommodated on the two sides card shown. A title 822 on the data card indicates that the card is for channel mapping for cable company X. A down arrow 832 indicates to insert the card into the scanner in the downward direction, in the direction of the arrow 832. When the card is turned over the arrow 834 will also be in the downward direction. The assigned channel numbers and local channel numbers are indicated by numbers 828 along the side of the card.

The data cards 820 can be used to enter a number of different types of data. In order that the type of category of data being entered is easily determined, a type code 826 is coded onto the card and labeled with label 824. The encoded type code 826 indicates the category or type of data contained on the rest of the data card 820.

When the data card is inserted into slot 806 and scanned past the array's scanner 804, the array scanner which consists of a array of seven photo transistor, detects reflected ambient light passing through clear window 802.

To automatically channel map, the user slides the data card into the slot 806. As the data card is pushed through the slot, the channel pairs in the left column are read in sequence. The user then removes the card from the remote, turns it upside down, and repeats the process to read the numbers in the right column. The card can be turned over, and the sequence repeated until all four columns are read. The mapped data is stored in RAM in the remote and can then be sent to the television 10. The remote controller 800 can contain a compressed code decoder as described in U.S. Pat. No. 5,335,079. In that case, the instant programmer 300 uses the stored channel map data scanned from the data card 820 to decode compressed codes to CDTL and to map assigned channel numbers to local channel numbers. In the case that the compressed decoding is performed in television 10 by compressed decoder 26, the channel map data scanned from data card 820 can be transmitted to the command controller 24 so that the television 10 can map assigned channel numbers to local channel numbers.

Figure 8:
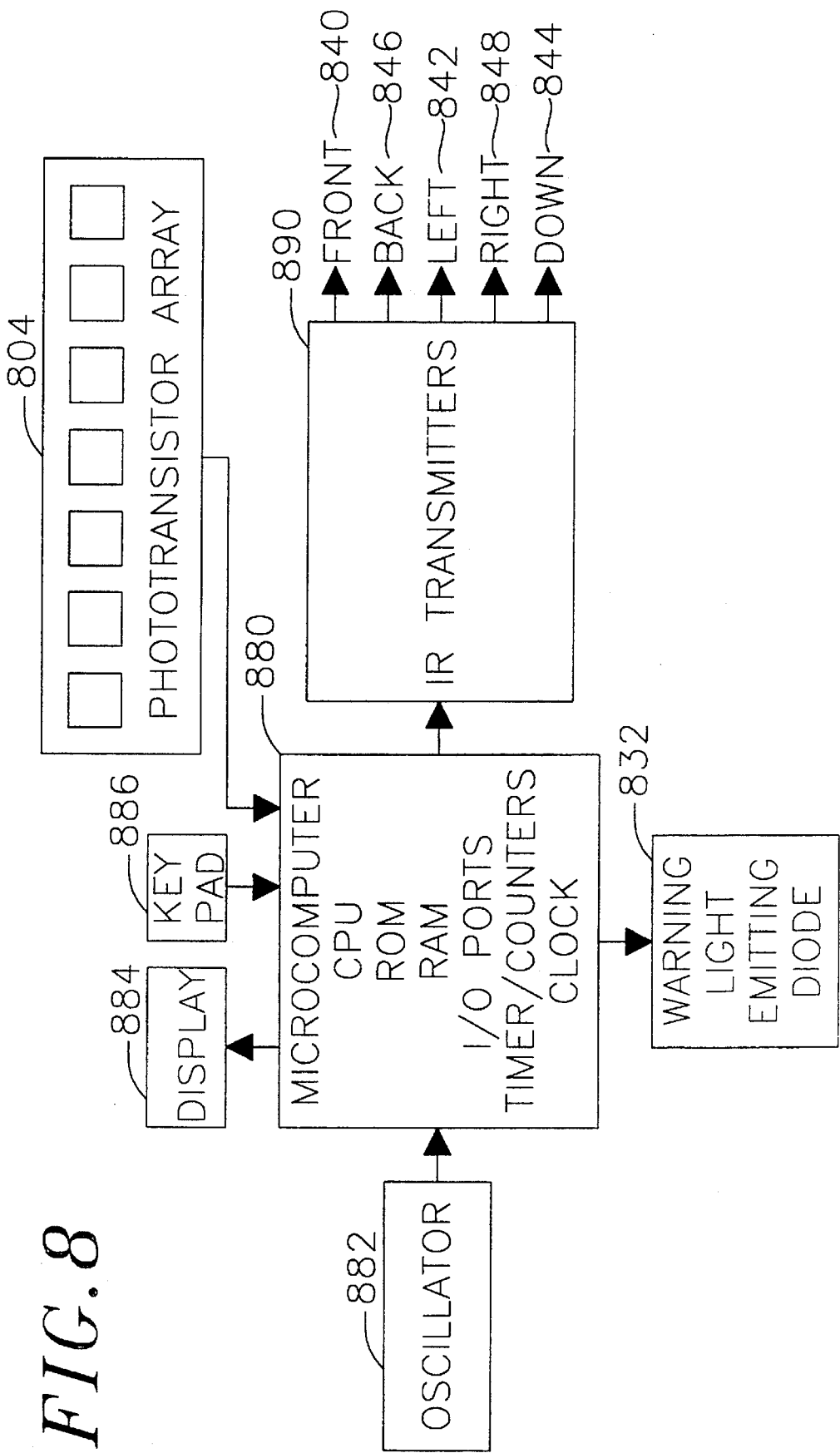
FIG. 8 is a schematic for circuitry to implement the remote controller of FIG. 7.

FIG. 8 is a schematic of circuitry for implementing the remote controller 800 shown in FIG. 7. The remote controller 800 an be implemented with a microcomputer 880 that contains a CPU, a ROM, a RAM, I/O ports, timers, counters, and a clock. An oscillator 882 is used by the clock for maintaining time. The keys shown on the remote controller 800 in FIG. 7 are illustrated in FIG. 8 as key pad 886. The scanning array is implemented by phototransistor array 804. A warning light emitting diode 832 is used to warn a user that a program is about to be recorded so that the user can ensure that the VCR is loaded with a blank tape. The remote controller 800 can contain multiple infrared transmitters and can contain a five-way infrared transmitter 890 that is able to transmit to the front 840, to the back 846, to the left 842, to the right 848 and down 844.

Figure 9:
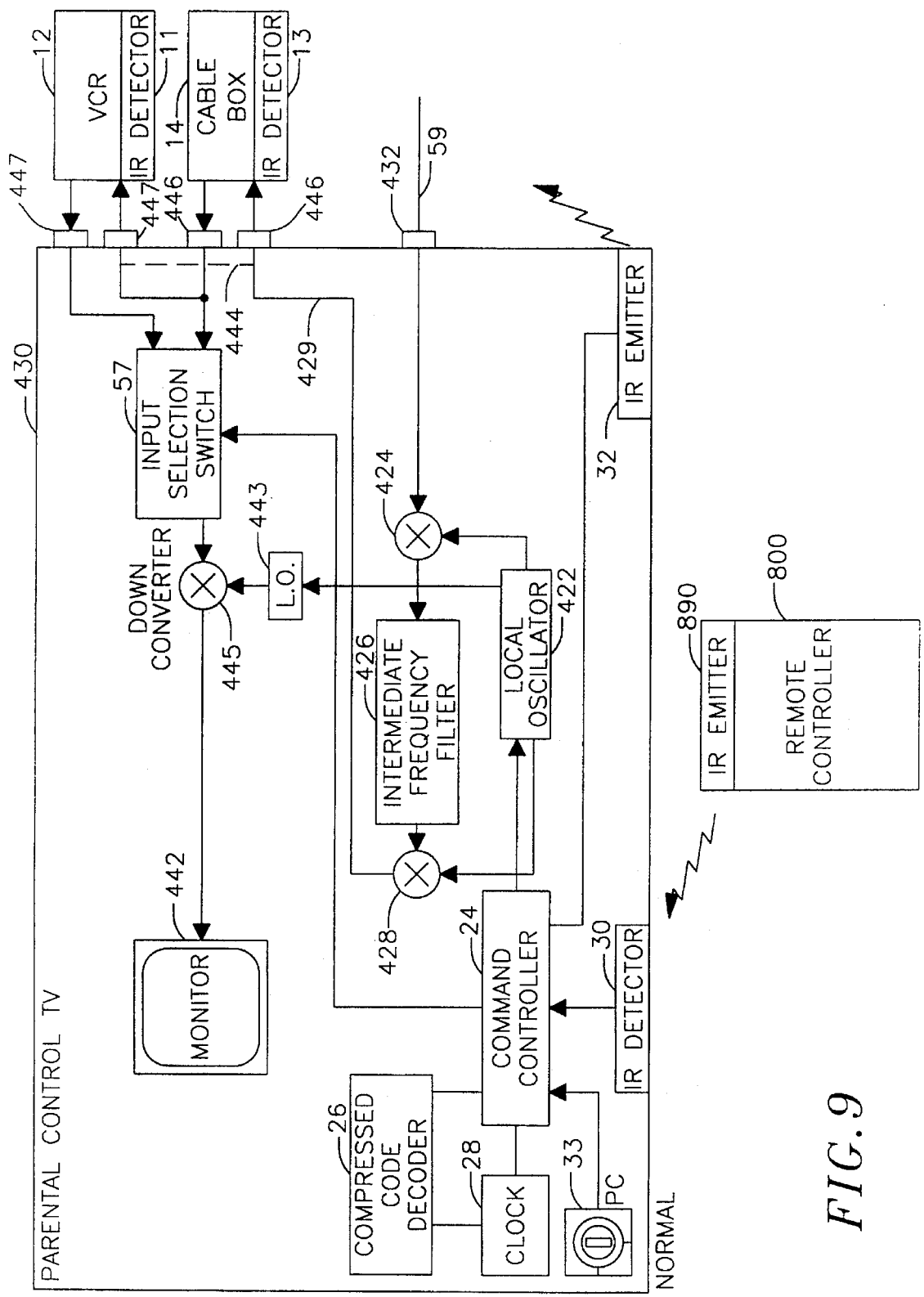
FIG. 9 is a block diagram of a television providing parental control of viewing according to the present invention.

U.S. patent application Ser. No. 08/138,632, filed Oct. 15, 1993, which is incorporated herein as though set forth in full, describes a television that allows parental control of viewing of programs. A specific embodiment of a parental control TV 430 is shown in FIG. 9. A signal source input line 59 is attached to parental control television 430 through a tamper proof connector 432. The broad band signal on line 59 is shifted in frequency by frequency down-converter 424 and then band-pass filtered by intermediate frequency filter 426 and then up-converted in frequency by frequency upconverter 428. The frequency down-conversion in frequency down-converter 424 and the frequency up-conversion in frequency upconverter 428 are the same and determined by the setting of tunable local oscillator 422. The local oscillator 422 is controlled by command controller 24 and is tuned to select only enabled programs for viewing. As shown FIG. 9, command controller 24 is coupled to compressed code decoder 26 and clock 28 as well as infrared detector 30 and infrared emitter 32. Command controller 24 and compressed code decoder 26 can be implemented by a microcomputer, such as shown in FIG. 3. The output of frequency upconverter 428 is sent to cable box 14 which is attached to parental control television 430 via tamper proof connectors 446. The cable box 14 must be tuned to the same channel that is selected by command controller 24. This is accomplished by command controller 24 sending via infrared emitter 32 and infrared detector 13 a command to switch to the channel that has been selected. The cable box 14 converts the cable channel and performs an unscrambling of any scrambled channels and then outputs onto channel 3 or 4 the selected program. A VCR 12 can also be connected to a parental control television 430 via connectors 447. The selection between VCR 12 and cable box 14 is performed by input selection switch 57 which is controlled by command controller 24. The output of input selection switch 57 is sent to frequency down-converter 445 which downshifts the television signal for input to the monitor 442. As shown in FIG. 9, it is possible to send the output 429 of frequency upconverter 428 directly to the VCR 12 via line 444. This is useful if a selected channel does not need to be descrambled by cable box 43.

The programs to be enabled for viewing can be entered via remote controller 800 and communicated from remote controller 800 via infrared emitter 890 to infrared detector 30.

The parental control television 430, via the command controller 24 only enables the selected programs for viewing. The command controller 24 accomplishes this by commanding the local oscillator 422 and the input selection switch 57 so that only programs that have been enabled are passed at the correct time by intermediate frequency filter 826 and down converter 424 and up converter 428 to line 429, which can be either sent to the cable box for descrambling a scrambled channel or directly via dotted line 444 to input selection switch 57. The command controller 24 uses the output of clock 28 in order to determine the correct times for enabling a particular channel so that an enable program can be viewed.

The programs to be enabled for viewing can be entered by the user by entering channel, date, time of day, and length (CDTL) information for a program to be enabled or the user can enter a compressed code which is representative of an compressed in length from the combination of channel, date, time of day, and length according to the description in U.S. Pat. No. 5,335,079. Entering CDTL information for each enabled program is a very tedious operation. Even entering compressed codes for each enable program is a tedious operation especially when up to 200 channels of programming are available for viewing. Another way of entering the data for enabled programs is to use remote controller 800 and a data card 820 encoded to contain compressed codes for enabled programs.

Figure 10:
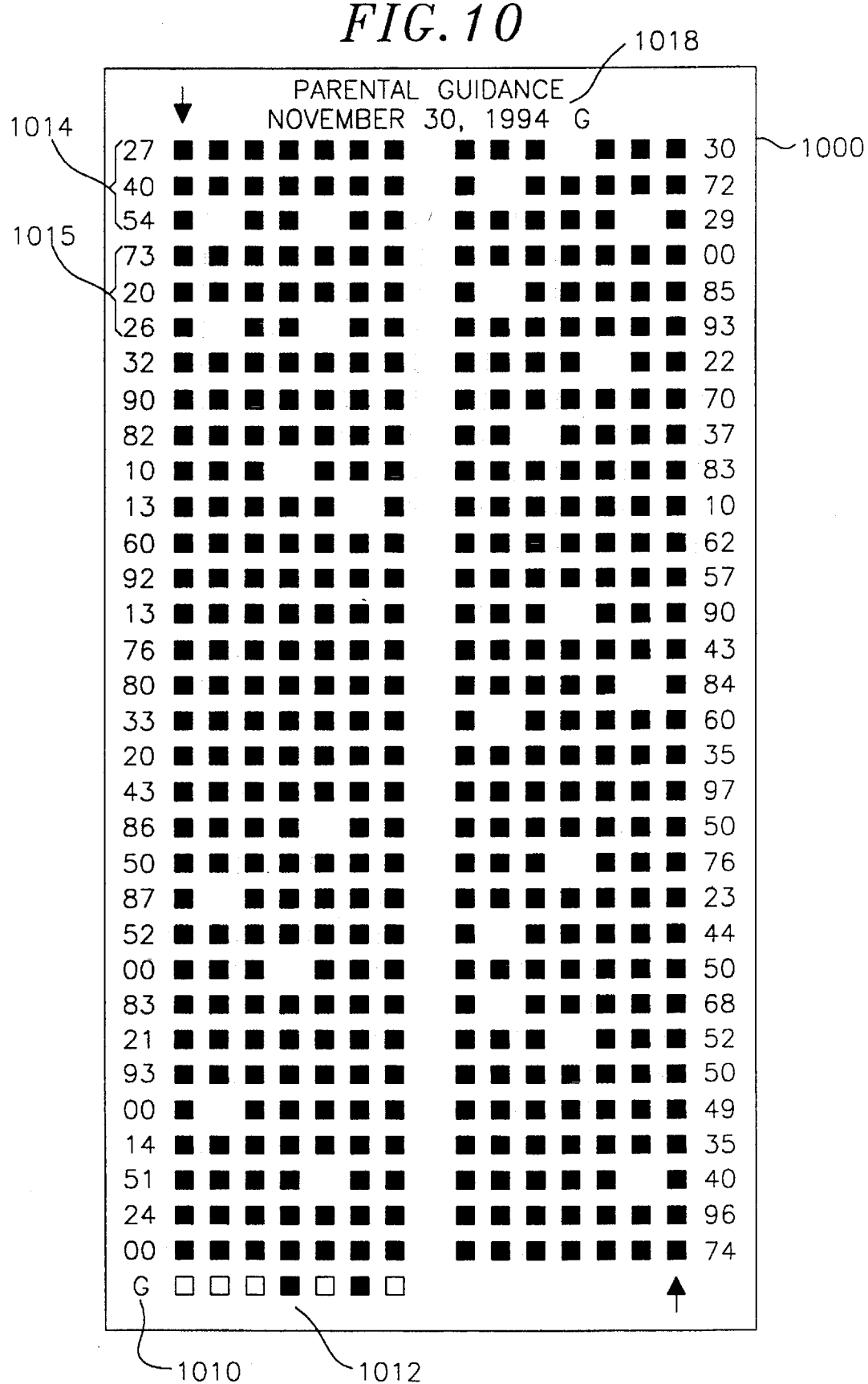

FIG. 10 illustrates a data card 1000 that contains compressed codes corresponding to G rated programs, as indicated by the G in title 1018. At the top of the data card is a title PARENTAL GUIDANCE. Also at the top of the data card is the date Nov. 30, 1994. The date indicates the date on which the programs corresponding to the compressed codes are broadcast. The data card could be published by a newspaper on a daily basis and each day a parent could remove the card from the publication and scan the card through the remote controller 800 to select which programs are enabled for that day. The compressed codes corresponding to each program are typically seven or fewer digits. The seven digits can be represented by three lines of seven dots. For example, the first three lines on data card 1000 have a coding of 27, 40, and 54, and are represented as element 1014. These three lines can be used to represent a compressed code that is compressed in length from and represents a program having a channel, date, time of day, and length. The next compressed code to be enabled is represented by the lines designated in FIG. 10 as element 1015. At the bottom of the left column of lines is pattern 1012 identified by the label represented as element G, 1010. The pattern 1012 is used to indicate that the codes on this data card correspond to G rated programs and is read and stored during the scanning process.

Figure 11:
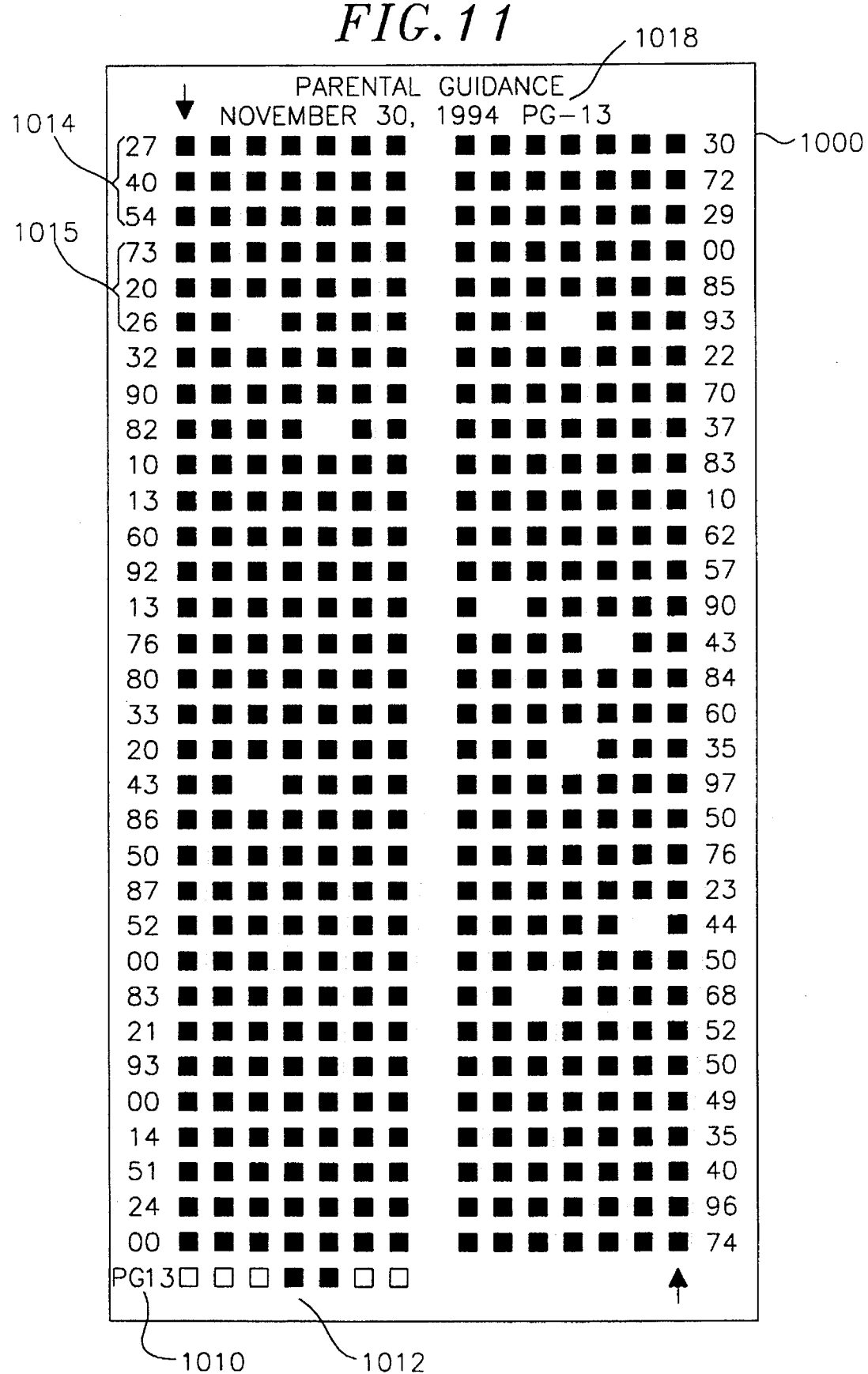

FIG. 11 illustrates another data card 1000 that can be used to enable the viewing of PG-13 rated programs for the date Nov. 30, 1994. This card is identified by code 1012 and PG-13 label 1010, as a card having PG-13 rated programs.

Figure 12:
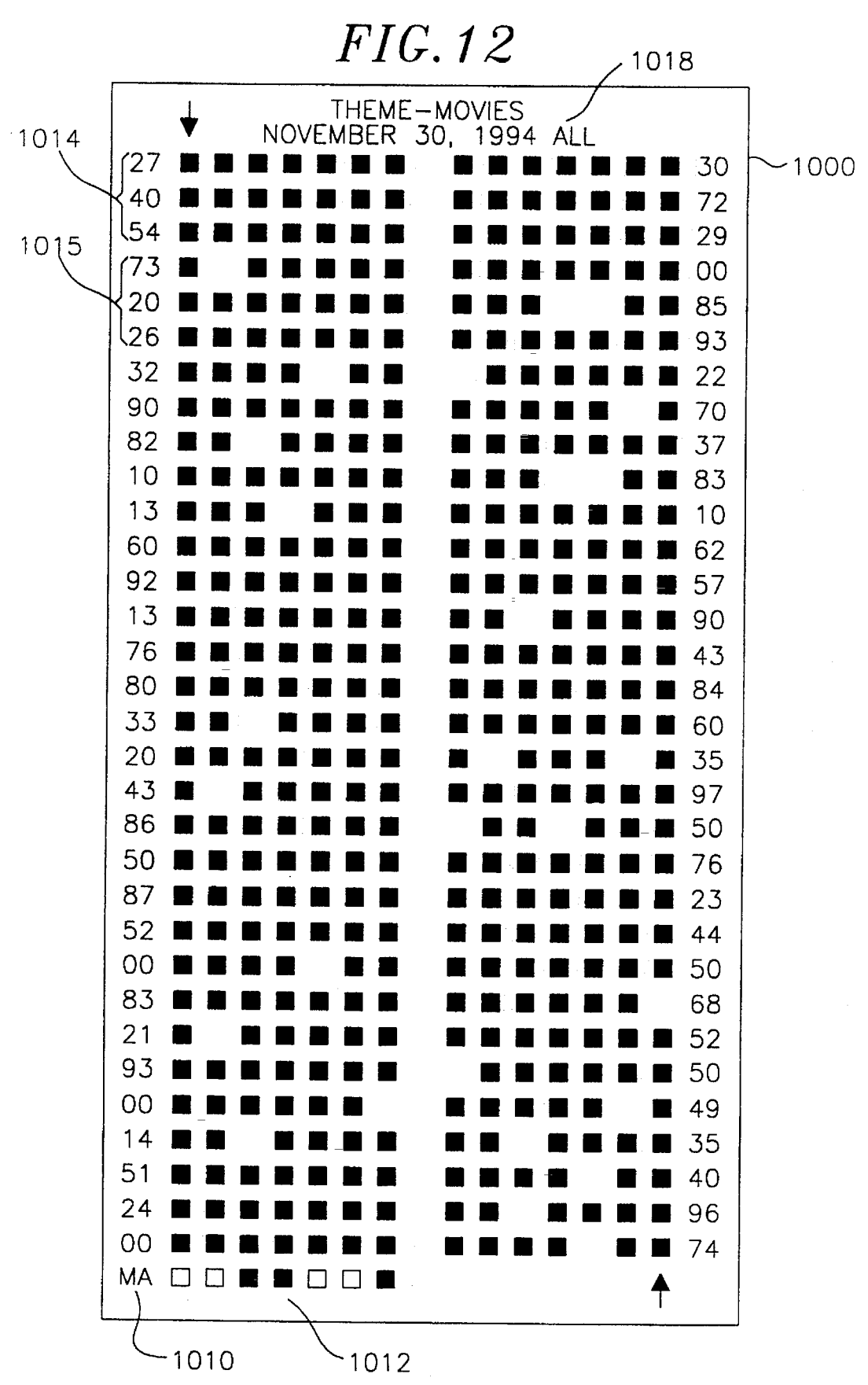

Another use of the data card 1000 is to list all of the movies that are available on a particular date. FIG. 12 illustrates a data card encoded to contain the compressed codes for all the movies playing on Nov. 30, 1994. This type of card can be used to enable the user to conveniently scan or surf through channels corresponding only to movies. A theme button such as movie theme button 812 on remote controller 800 is pressed to advance a tuner whether the tuner be in the television, cable box, or VCR to the next channel having a movie playing at the time that the user is scanning through the channels. This can be accomplished by decoding the compressed codes inputted via data card 1000 into CDTL information and then sorting the CDTL information by date and time of day and then storing the sorted list. When the user presses the theme button for movies on remote controller 800, the command controller 24 changes the tuning for television 830 to cycle through the list of channels input and stored via the input data card for the movie theme and corresponding to a date and time of day for which the scanning is being requested. For example, if a movie started at 2:30 and has a length of two hours and the scanning is being done at 3:30, then that channel would be one of the scanned channels. The scanning could advance to the next movie channel each time the user presses the movie theme key 812. Alternatively, when the user presses the movie theme key once, the scanning automatically advances through all of the channels currently showing movies and pauses at each movie for a predetermined period of time, such as ten seconds, before advancing to the next movie. Then, when the user presses the movie theme key 812 again, the scanning stops at the movie currently being viewed. The codes on data card 1000 are identified as corresponding to all movies by code 1012 and label 1010 at the bottom of the left column of FIG. 12.

Figure 13:
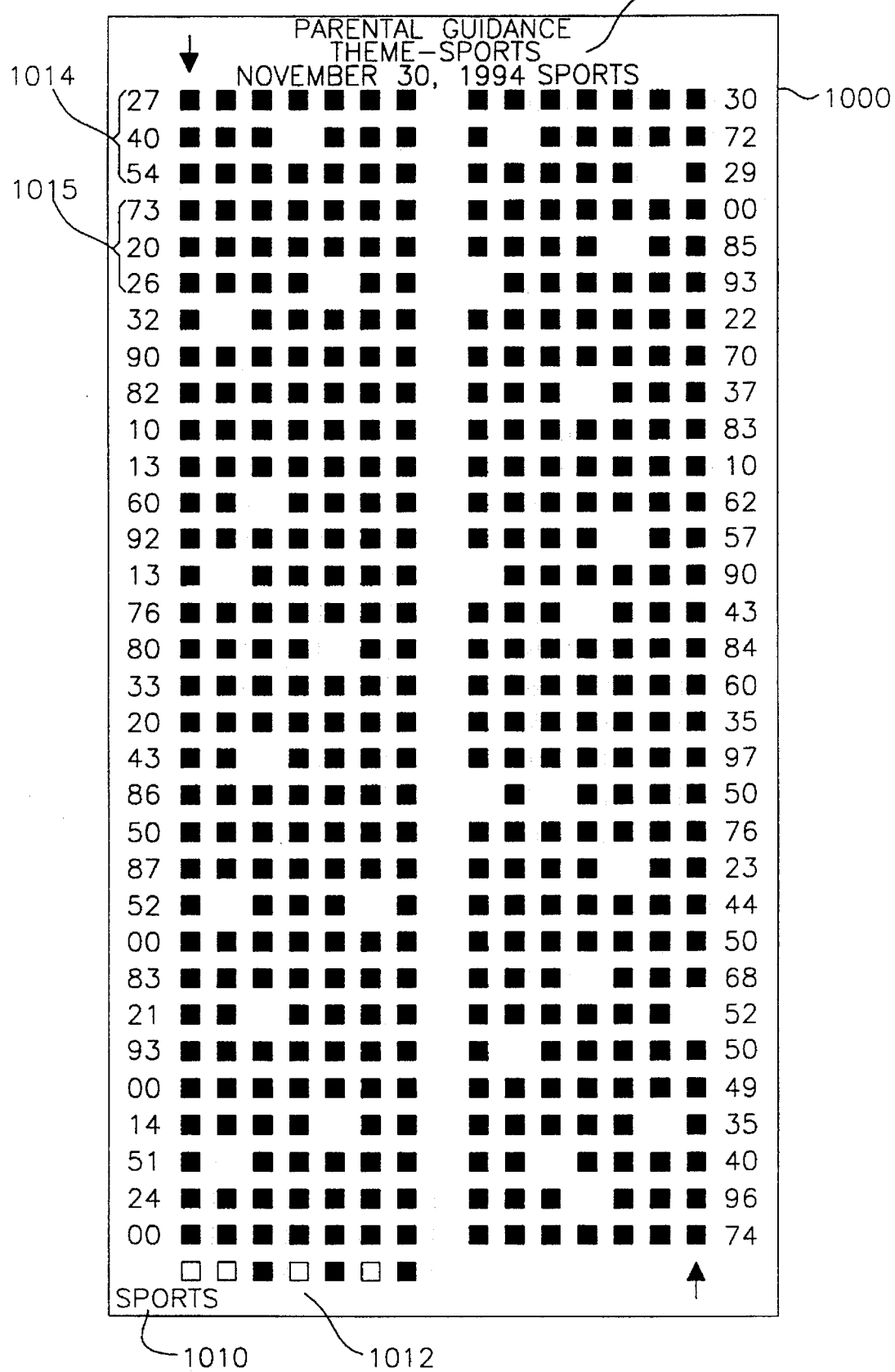

The data card 1000 can also be used for other themes such as sports as indicated by the data card shown in FIG. 13, which is for sports. A theme key for sports is shown on a remote controller 800 and can be operated in the same manner as the movie theme key.

The remote controller can also contain keys such as a G theme key and a PG theme key 812. These keys can be used in the same manner as the movie theme key or the sports theme key to scan through channels corresponding to G or PG rated programs that have been enabled and that are currently being received by the video system.

The input data cards provide a convenient way for a user to enable a certain category of programming for viewing. Once the input data contained in the coding of the input data card is entered into the remote controller or into the parental control television, then the input data can be used for scanning the channels by using the theme keys on the remote controller 800.

FIG. 14 illustrates a table of type codes 1030 for categories of input data 1032. For example, type code 5 corresponds to a channel mapping input data card. The type code 5 is coded onto the input data card as shown in FIG. 7 by code 826 at the bottom of the left column of input data card 820. As listed in FIG. 14 the category of input data cards can include a channel mapping, parental guidance G, PG, PG-13, and R rated programs, selected programs to be enabled, selected channels to be enabled, and theme selections for news sports, G rated movies, PG rated movies, R rated movies, all movies, educational programs, and history programs. Clearly the list of categories of input data cards can be expanded to include other categories. The use of the input data cards, published by a reputable publisher, relieves a parent from the need for selecting channels or programs to be enabled each day. The parent can scan the published input data cards for the category of programming desired relatively quickly and be assured that their children will not be viewing undesirable programs.

Figure 15A:
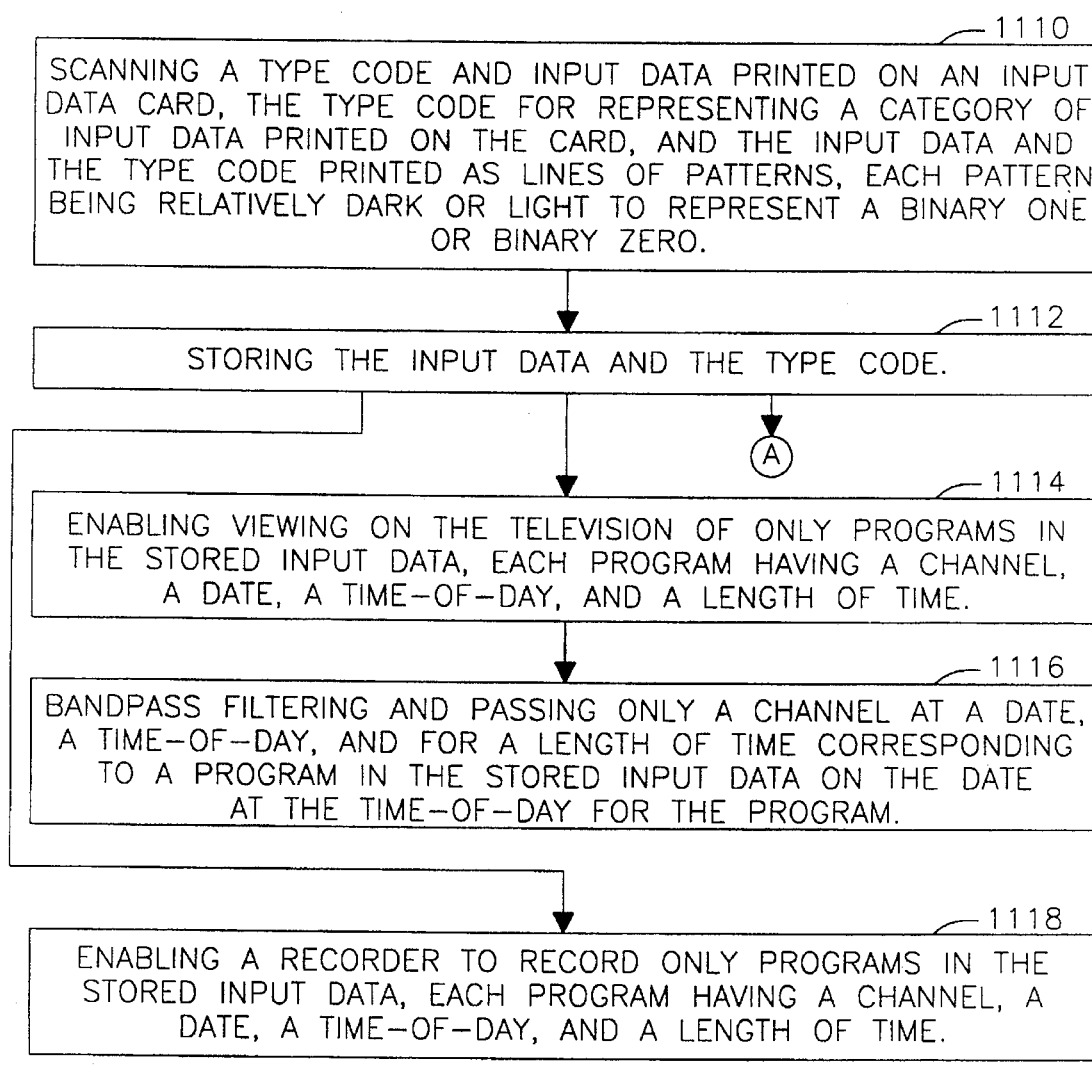
FIGS. 15A, 15B and 16 are flow diagrams of methods for controlling a video system according to the present invention.
Figure 15B:
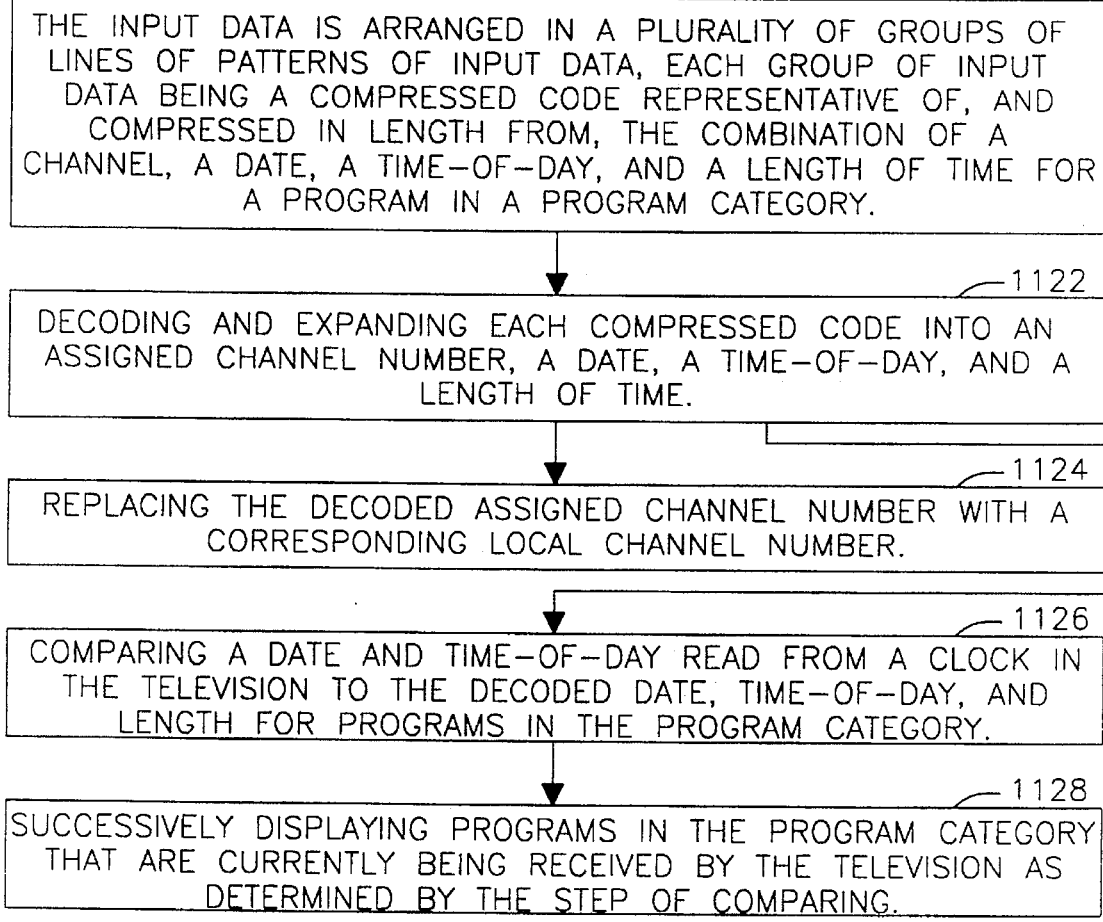

FIGS. 15A and 15B are flow diagrams for using the input data card for controlling a video system. In step 1110 the input data card is scanned and the input data is stored in step 1112. In step 1114 the input data is used to enable only certain programs for viewing. This is performed by selectively bandpass filtering channels as shown in step 1116. In step 1118, the input data is used to enable the recording of only certain programs.

If the input data is compressed codes then the method uses steps 1120, 1122, and 1124 for decoding the compressed codes. Channel surfing is performed according to steps 1126 and 1128.

Figure 16:
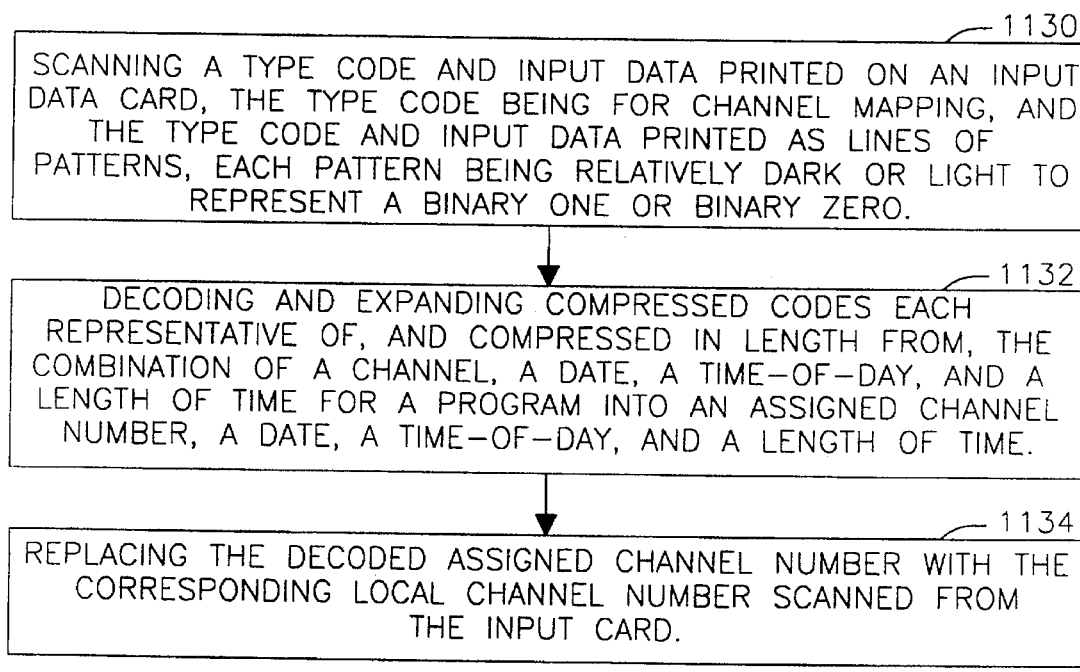

FIG. 16 is a flow diagram of a method for using the data input cards for channel mapping and consists of steps 1130, 1132 and 1134.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A system for controlling a video system comprising:
   a printed input data card comprising:
      a type code printed on the input data card, the type code for representing a category of input data printed on the card; and
      a plurality of input data printed on the input data card;
   a command input device comprising:
      means for scanning the input card containing the type code and the input data; and
      means for decoding the type code to determine the category of the plurality of input data;
   wherein:
      the type code comprises a channel mapping category; and
      the input data is arranged in pairs, a first input data of each pair representing an assigned channel number and a second input data of each pair representing a corresponding local channel number.

2. The system of claim 1 wherein:
   the type code is printed as a line of patterns, each pattern being relatively dark or light to represent a binary one or binary zero; and
   each input data is printed as a line of patterns, each pattern being relatively dark or light to represent a binary one or binary zero.

3. The system of claim 1 further comprising:
   means for storing each pair representing an assigned channel number and a corresponding local channel number; and
   means for replacing an entered assigned channel with a corresponding local channel number by looking up the stored assigned channel number and accessing the stored corresponding local channel number.

4. The system of claim 1 wherein the command input device comprises a remote controller for the video system.

5. A system for controlling a video system comprising:
   a printed input data card comprising:
      a type code printed on the input data card, the type code for representing a category of input data printed on the card; and
      a plurality of input data printed on the input data card;
   a command input device comprising:
      means for scanning the input card containing the type code and the input data; and
      means for decoding the type code to determine the category of the plurality of input data;
   wherein the type code comprises a program category and the input data is arranged in a plurality of groups, each group of input data comprising a compressed code representative of, and compressed in length from, the combination of a channel, a date, a time-of-day, and a length of time for a program in the program category; and
   the system further comprises:
      means for decoding and expanding each compressed code into a channel, a date, a time-of-day, and a length of time for a program in the program category; and
      means for controlling viewing of programs by enabling the playing of programs in the program category on a television and inhibiting other programs from playing on the television.

6. The system of claim 5 wherein:
   the type code is printed as a line of patterns, each pattern being relatively dark or light to represent a binary one or binary zero; and
   each input data is printed as as line of patterns, each pattern being relatively dark or light to represent a binary one or binary zero.

7. The system of claim 5 further comprising
   means for controlling recording of programs by enabling only the recording of programs in the program category.

8. The system of claim 5 wherein the command input device comprises a remote controller.

9. A system for controlling a video system comprising:
   a printed input data card comprising:
      a type code printed on the input data card, the type code for representing a category of input data printed on the card; and
      a plurality of input data printed on the input data card;
   a command input device comprising:
      means for scanning the input card containing the type code and the input data; and
      means for decoding the type code to determine the category of the plurality of input data;
   wherein the type code comprises a parental control category and the input data represent compressed codes, representative of, and compressed in length from, the combination of a channel, a date, a time-of-day, and a length of time for the programs or channels to be controlled for viewing; and
   the system further comprises:
      means for controlling the viewing of programs or channels, each program having a channel, a date, a time-of-day, and a length of time, coupled to a television signal source, the means for controlling responsive to a transmitted type code comprising a parental control category, and the means for controlling comprising:
         means for decoding and expanding the scanned input data representing compressed codes, each compressed code decoded into a channel, a date, a time-of-day, and a length of time for the program or channel to be controlled for viewing;
         a clock for providing a clock output as a function; and
         processor means for determining that the decoded and expanded compressed code for the program or channel selected to be controlled for viewing has a pre-determined relationship to the clock output.

10. The system of claim 9 wherein:
    the type code is printed as a line of patterns, each pattern being relatively dark or light to represent a binary one or binary zero; and
    each input data is printed as a line of patterns, each pattern being relatively dark or light to represent a binary one or binary zero.

11. The system of claim 5 wherein:
    the type code comprises a theme selection and the input data represent compressed codes, representative of, and compressed in length from, the combination of a channel, a date, a time-of-day, and a length of time for programs providing programming matching the theme selection; and
    the system further comprises:
       means for controlling the viewing of programs to enable only the viewing of programs represented by the input data coupled to a television signal source, the means for controlling responsive to a transmitted type code comprising a theme selection.

12. The system of claim 11 wherein the command input device comprises a remote controller for the video system.

13. Apparatus for controlling a video system comprising:
a remote controller comprising:
means for scanning a printed input data card including a type code printed on the input data card, the type code for representing a category of input data printed on the card; and
means for transmitting the input data and the type code; and
a television comprising:
means for receiving the input data and the type code;
means for storing the received input data and the type code; and
means for enabling viewing of only programs in the stored input data, each program having a channel, a date, a time-of-day, and a length of time, the means for enabling responsive to a received type code comprising a parental control category.

14. The apparatus of claim 13 wherein the means for enabling viewing comprises:
means for filtering for passing only a channel at a date, a time-of-day, and for a length of time corresponding to a program in the stored input data; and
a clock having an output as a function of date and time-of-day coupled to the means for filtering.

15. The apparatus of claim 13 wherein the television further comprises:
a means for enabling a recorder to record only programs in the stored input data, each program having a channel, a date, a time-of-day, and a length of time, the means for enabling responsive to a received type code comprising a parental control category.

16. The apparatus of claim 13 wherein:
the type code comprises a program category;
the input data is arranged in a plurality of groups of lines of patterns of input data, each group of input data comprising a compressed code representative of, and compressed in length from, the combination of a channel, a date, a time-of-day, and a length of time for a program in the program category; and
the television comprises:
means for decoding and expanding each compressed code into an assigned channel, a date, a time-of-day, and a length of time for a program.

17. The apparatus of claim 16 wherein:
the type code comprises a channel mapping category;
the input data comprises pairs of input data, a first input data of each pair representing an assigned channel number and a second input data of each pair representing a corresponding local channel number; and
the means for decoding and expanding compressed codes comprises a means for replacing an assigned channel with a corresponding local channel number by looking up the stored assigned channel number and accessing the stored corresponding local channel number.

18. The apparatus of claim 16 further comprising:
means for comparing a date and time-of-day read from a clock in the television to the decoded date, time-of-day, and length for programs in the program category; and
means for successively displaying on the television programs in the program category that are currently being received by the television as determined by the means for comparing the date and time-of-day read from the clock in the television to the date, time-of-day, and length for programs in the program category.

19. The apparatus of claim 18 wherein the remote controller comprises at least one program category button for commanding the successive display of programs in the program category on the television.

20. Apparatus for controlling a video system comprising:
a remote controller comprising:
means for scanning a printed input data card including a type code printed on the input data card, the type code for representing a category of input data printed on the card; and
means for transmitting the input data and the type code; and
a recorder comprising:
means for receiving the input data and the type code; and
means for storing the received input data and the type code; and
means for enabling a recorder to record only programs in the stored input data, each program having a channel, a date, a time-of-day, and a length of time, the means for enabling responsive to a received type code comprising a parental control category.

21. The apparatus of claim 20 wherein:
the type code comprises a program category;
the input data is arranged in a plurality of groups of lines of patterns of input data, each group of input data comprising a compressed code representative of, and compressed in length from, the combination of a channel, a date, a time-of-day, and a length of time for a program in the program category; and
the recorder comprises:
means for decoding and expanding each compressed code into an assigned channel, a date, a time-of-day, and a length of time for a program.

22. The apparatus of claim 21 wherein:
the type code comprises a channel mapping category;
the input data comprises pairs of input data, a first input data of each pair representing an assigned channel number and a second input data of each pair representing a corresponding local channel number; and
the means for decoding and expanding compressed codes comprises a means for replacing an assigned channel with a corresponding local channel number by looking up the stored assigned channel number and accessing the stored corresponding local channel number.

23. A method for controlling a video system including a television comprising the steps of:
scanning a printed input data card including a type code printed on the input data card, the type code for representing a category of input data printed on the card; and
storing the input data and the type code;
enabling viewing on the television of only programs in the stored input data, each program having a channel, a date, a time-of-day, and a length of time, the step of enabling responsive to a received type code comprising a parental control category.

24. The method of claim 23 wherein the step of enabling viewing comprises the step of:
filtering and passing only a channel at a date, a time-of-day, and for a length of time corresponding to a program in the stored input data on the date at the time-of-day for the program.

25. The method of claim 23 further comprising the step of:
enabling a recorder to record only programs in the stored input data, each program having a channel, a date, a time-of-day, and a length of time, the step of enabling responsive to a received type code comprising a parental control category.

26. The method of claim 23 wherein:

the type code comprises a program category; and the input data is arranged in a plurality of groups of lines of patterns of input data, each group of input data a channel, a date, a time-of-day, and a length of time for a program in the program category; and the method further comprises the step of:

comparing a date and time-of-day, read from a clock in the television to the date, time-of-day, and length for programs in the program category; and successively displaying on the television programs in the program category that are currently being received by the television as determined by the step of comparing the date and time-of-day read from the clock in the television to the date, time-of-day, and length for programs in the program category.

27. The method of claim 26 wherein the step of successively displaying programs on the television comprises the step of performing the step of successively displaying programs upon a command being received.

28. The method of claim 23 further comprising the steps of:

scanning a printed input data card including a type code printed on the input data card, the type code being for channel mapping, and the input data comprising pairs of input data, a first input data of each pair representing an assigned channel number and a second input data of each pair representing a corresponding local channel number;

storing the input data comprising pairs of input data, a first input data of each pair representing an assigned channel number and a second input data of each pair representing a corresponding local channel number; and replacing an entered assigned channel number with the corresponding local channel number scanned from the input data card by looking up the stored assigned channel number and accessing the stored corresponding local channel number.

29. A method for controlling a video system including a television comprising the steps of:

scanning a printed input data card including a type code printed on the input data card, the type code being for channel mapping, and the input data comprising pairs of input data, a first input data of each pair representing an assigned channel number and a second input data of each pair representing a corresponding local channel number;

storing the input data pairs of input data, a first input data of each pair representing an assigned channel number and a second input data of each pair representing a corresponding local channel number; and replacing an entered assigned channel number with the corresponding local channel number scanned from the input data card by looking up the stored assigned channel number and accessing the stored corresponding local channel number.

\* \* \* \* \*